(12) United States Patent
Heimendinger et al.

(10) Patent No.: US 8,825,649 B2
(45) Date of Patent: Sep. 2, 2014

(54) SMART DEFAULTS FOR DATA VISUALIZATIONS

(75) Inventors: Scott Heimendinger, Seattle, WA (US);
Jason Burns, Bellevue, WA (US);
Patrick J. Baumgartner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 12/840,447

(22) Filed: Jul. 21, 2010

(65) Prior Publication Data

US 2012/0023101 A1 Jan. 26, 2012

(51) Int. Cl.
*G06F 17/30* (2006.01)

(52) U.S. Cl.
USPC .......................... 707/737; 707/752; 707/754

(58) Field of Classification Search
CPC .................. G06F 17/30038; G06F 17/30696;
G06F 17/30716; G06F 17/3071; G06F 11/3438; G06F 17/30994
USPC ......................................... 707/737, 752, 754
See application file for complete search history.

(56) References Cited

U.S. PATENT DOCUMENTS

| | | | |
|---|---|---|---|
| 6,829,599 B2 | 12/2004 | Chidlovskii | |
| 6,990,480 B1* | 1/2006 | Burt | 1/1 |
| 7,069,308 B2* | 6/2006 | Abrams | 709/218 |
| 7,548,982 B2 | 6/2009 | Gu et al. | |
| 8,055,673 B2* | 11/2011 | Churchill et al. | 707/767 |
| 8,358,308 B2* | 1/2013 | Robertson et al. | 345/440 |
| 8,566,334 B2* | 10/2013 | Lehtipalo et al. | 707/758 |
| 2001/0012299 A1* | 8/2001 | Dahlen | 370/429 |
| 2002/0135614 A1* | 9/2002 | Bennett | 345/745 |
| 2003/0130998 A1* | 7/2003 | Fox et al. | 707/3 |
| 2004/0153445 A1* | 8/2004 | Horvitz et al. | 707/3 |
| 2005/0066104 A1* | 3/2005 | Train et al. | 710/305 |
| 2005/0138160 A1* | 6/2005 | Klein et al. | 709/223 |
| 2006/0020662 A1* | 1/2006 | Robinson | 709/203 |
| 2006/0106793 A1* | 5/2006 | Liang | 707/5 |
| 2006/0112123 A1 | 5/2006 | Clark et al. | |
| 2006/0116994 A1* | 6/2006 | Jonker et al. | 707/3 |
| 2006/0161313 A1 | 7/2006 | Rogers et al. | |
| 2006/0168594 A1* | 7/2006 | Deverill et al. | 719/318 |
| 2006/0224987 A1 | 10/2006 | Caffarelli | |

(Continued)

OTHER PUBLICATIONS

"International Search Report", Mailed Date: Feb. 23, 2012, Application. No. PCT/US2011/042896, Filed Date: Jul. 2, 2011, pp. 9.

(Continued)

*Primary Examiner* — Thanh-Ha Dang
(74) *Attorney, Agent, or Firm* — Tom Wong; Jim Ross; Micky Minhas

(57) ABSTRACT

Smart defaults are provided for data visualization by creating a default layout of rows, columns, filters, and comparable elements that improve a user's experience in finding relevant answers within the data. Usage history of the ways that users look at data in various data sources, user specific information, and inferred relationships between a current user and similar users are used to determine elements relevant to visualization of data for a particular user such that the visualization process may be automatically started, and a relevance model is formed/adjusted based on these factors. Queries may also be executed in a preemptive fashion based on the relevance model and results provided to a requesting user more rapidly enhancing user experience with networked data visualization.

19 Claims, 7 Drawing Sheets

(56) References Cited

U.S. PATENT DOCUMENTS

| | | | |
|---|---|---|---|
| 2006/0271961 A1* | 11/2006 | Jacoby et al. | 725/46 |
| 2007/0129977 A1* | 6/2007 | Forney | 705/7 |
| 2007/0174083 A1 | 7/2007 | Silverman et al. | |
| 2007/0208730 A1 | 9/2007 | Agichtein et al. | |
| 2007/0250783 A1 | 10/2007 | Wu et al. | |
| 2008/0005067 A1* | 1/2008 | Dumais et al. | 707/3 |
| 2008/0222132 A1 | 9/2008 | Pan et al. | |
| 2008/0243763 A1* | 10/2008 | Bishop et al. | 707/2 |
| 2008/0244429 A1* | 10/2008 | Stading | 715/764 |
| 2008/0250057 A1* | 10/2008 | Rothstein et al. | 707/102 |
| 2009/0248661 A1 | 10/2009 | Bilenko et al. | |
| 2009/0299963 A1* | 12/2009 | Pippuri | 707/3 |
| 2010/0250337 A1* | 9/2010 | Kassaei | 705/10 |
| 2011/0196864 A1* | 8/2011 | Mason et al. | 707/728 |
| 2011/0208709 A1* | 8/2011 | Holthausen | 707/706 |
| 2011/0213762 A1* | 9/2011 | Sherrets et al. | 707/706 |
| 2011/0219291 A1* | 9/2011 | Lisa | 715/207 |
| 2012/0233161 A1* | 9/2012 | Xu et al. | 707/732 |
| 2013/0080902 A1* | 3/2013 | Jaisinghani | 715/736 |

OTHER PUBLICATIONS

Hardtke, et al., "Demonstration of Improved Search Result Relevancy Using Real-Time Implicit Relevance Feedback", Retrieved at << http://www.surfcanyon.com/SurfCanyonDemonstrationResearchPaper.pdf >>, SIGIR, Jul. 19-23, 2009, pp. 7.

Kongdenfha, et al., "Rapid Development of Spreadsheet-based Web Mashups", Retrieved at << http://www2009.org/proceedings/pdf/p851.pdf >>, In Proceedings of the 18th International World Wide Web Conference, WWW, Apr. 20-24, 2009, pp. 851-860.

Waegel, et al., "Using Query History to Prune Query Results", Retrieved at << http://www.siam.org/meetings/sdm06/workproceed/Text%20Mining/waegel27.pdf >>, In Proceedings of Text Mining 2006 Workshop held in conjunction with SIAM Data Mining, 2006, pp. 5.

"China Notice on the First Office Action", Mailed Date: Aug. 24, 2012, Application No. 201110206376.4, Filed Date: Jul. 14, 2011, pp. 9.

* cited by examiner

SMART DEFAULTS FOR DATA VISUALIZATIONS

BACKGROUND

A majority of computerized activities ranging from performing searches to analyzing information include data retrieval from a variety of data sources and processing of the retrieved data. Data retrieval is typically performed by generating queries based on a user's request at a client device or server and submitting them to one or more relevant data sources.

In a networked environment, servers managing data sources may receive thousands—if not millions—of queries every day, retrieve the results, and provide them to requesting applications. Delays due to network conditions, interactions of multiple computing devices, etc. are a common occurrence in networked communications. Thus, the experience of visualizing data may be often hindered by slow query response times when a user activates a data visualization application (e.g. a spreadsheet application), which retrieves data from external data source(s).

Furthermore, when a user connects to a new data source (e.g. a database), visualizations of the data contained therein typically have to be structured anew. For example, a user connecting to a database via a spreadsheet application may be provided a list of dimensions and measures (or just columns) and a blank canvas area on which to arrange them. Users without pre-existing knowledge of the way the data is organized at the data source typically explore and sift through all of the irrelevant parts of the data to find a small set of information that is relevant to them.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatically providing data visualization by creating a default layout of rows, columns, filters, and comparable elements that improve a user's experience in finding relevant answers within the data. According to some embodiments, usage history of the ways that users look at data in various data sources, user specific information, and inferred relationships between a current user and similar users may be used to determine elements relevant to visualization of data for a particular user such that the visualization process may be automatically started. A relevance model may be formed/adjusted based on above discussed factors. According to other embodiments, queries may be executed in a preemptive fashion (prior to an actual request by a user) based on the relevance model and results may then be provided to a requesting user more rapidly enhancing user experience with networked data visualization.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
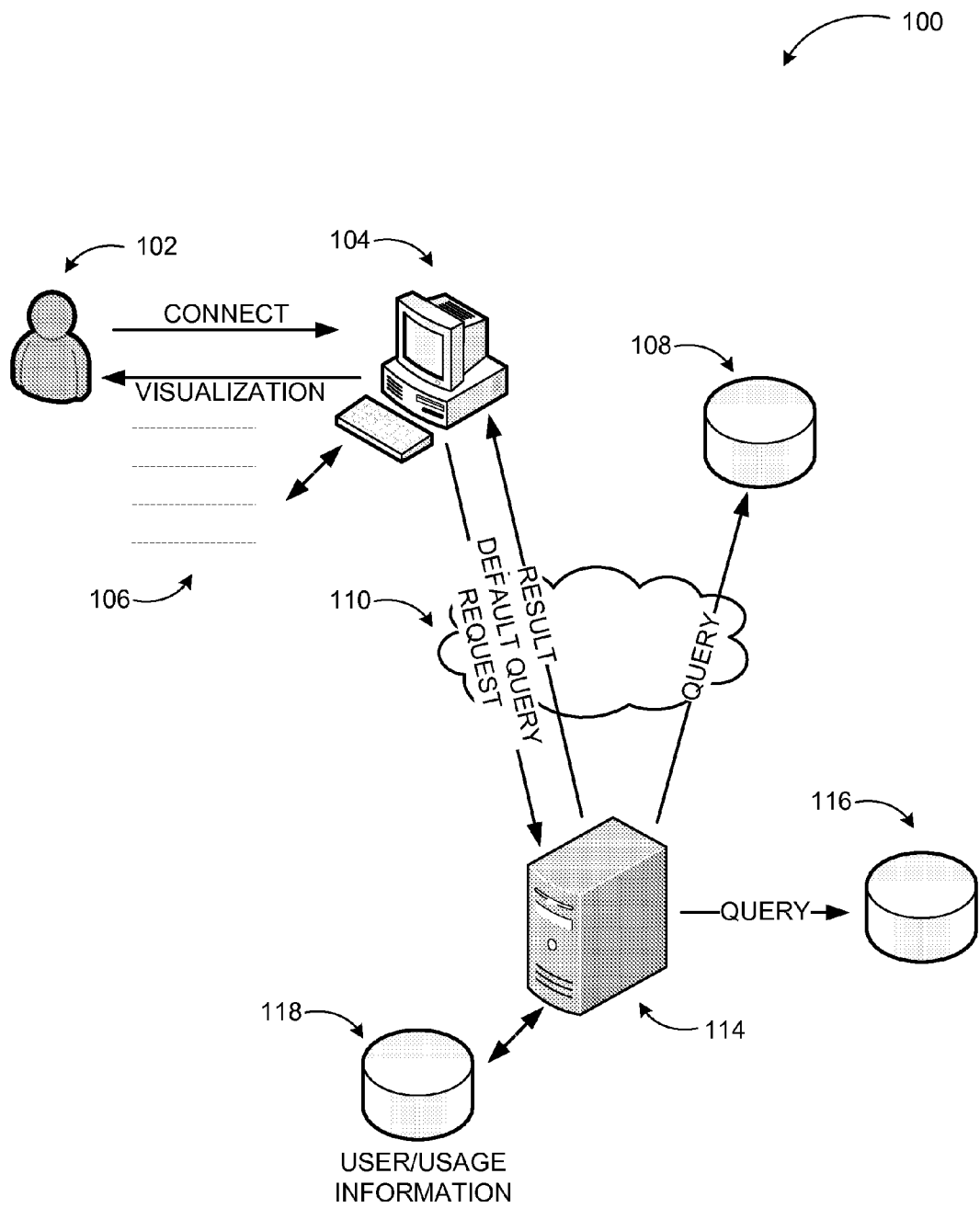
FIG. 1 illustrates interactions in an example networked system, where smart defaults for data visualization may be employed according to embodiments.

As briefly described above, usage history of the ways that users look at data in various data sources, user specific information, and inferred relationships between a current user and similar users may be used to determine elements relevant to visualization of data for a particular user, and data visualization provided by creating a default layout of rows, columns, filters, and comparable elements. Storing of query history, building of a relevance model, submitting a request to the relevance model, and binding relevance model results to a user interface may be the major aspects of a system starting the visualization process automatically. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may alternatively be a propagated signal on a carrier (e.g. a frequency or phase modulated signal) readable by a computing system and encoding a computer program of instructions for executing a computer process.

Throughout this specification, the term "platform" may be a combination of software and hardware components for providing data processing applications that may employ predictive data caching in executing queries. Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

FIG. 1 illustrates diagram 100 of interactions in an example networked system, where smart defaults for data visualization may be employed according to embodiments. In a typical networked system, user 102 may activate a data visualization application executed on client device 104. The visualization application may submit one or more queries to retrieve data associated with request(s) by user 102, process the data, and visualize the data for user 102. The visualization application may present a two-dimensional table, a multi-dimensional table, graphical presentations (e.g. charts, bar-graphs, and similar ones), textual or graphical analysis of the processed data, and comparable items. The visualization application may present these items by displaying static information on a computer monitor, displaying a video, printing the presented items, or even providing audio information to user 102. The retrieved data may be stored in various data stores such as data stores 108 or 116.

In a conventional system user 102 is likely to see a blank canvas area on which to arrange dimensions, members, measures, and similar data elements upon activating the visualization application, since the system may not have a default presentation. Thus, users without pre-existing knowledge of the way the data is organized at the data source may have to explore through the irrelevant parts of the data to find a relevant set of information to be visualized. A system according to embodiments enables automatic visualization of data 106 by creating a default layout of rows, columns, filters, and comparable elements based usage history of the ways that users look at data in various data sources, user specific information, and/or inferred relationships between a current user and similar users.

In such a system, the visualization application may be locally executed at computing device 104 or remotely executed at server 114 and accessed over network 110. Upon detecting the user's connection, the visualization application may retrieve user/usage related information and determine default elements such as rows, columns, filters, etc. based on the user/usage related information. User/usage related information may be retrieved from data source 118. To accomplish this, visualization application may submit an identifier associated with the user to data source 118 (e.g. a token). User/usage related information may include usage history of the ways that user 102 or similar users look at data in various data sources, specific information associated with user 102 such as their title or position in the organization, organizational profile, peer usage, query history, and/or inferred relationships between user 102 and similar users.

According to other embodiments, the visualization application may submit a default query upon detecting the user's connection and receive results such that default data can be presented to user 102 without delay and the user having to explore through the irrelevant parts of the data to find a relevant set of information to be visualized.

According to an example scenario, user 102 may wish to create a new filtered spreadsheet. First, user 102 may select a data source (e.g. 108, 116) from which the spreadsheet is to report the data 106. The spreadsheet application may connect to the selected data source passing along a token which identifies the user 102 within the context of the user's organization. The spreadsheet application may request from the data source a set of dimension hierarchies, members, and/or measures to place on the rows, columns, filters, and slicers section of the spreadsheet. This set represents a relevant default report for the user 102, based on what that user and similar users have historically viewed, and what data the user has permissions to view.

The components of the example system and interactions discussed above are for illustration purposes, and other servers, data stores, and network components such as firewalls may be involved in the communications.

Figure 2:
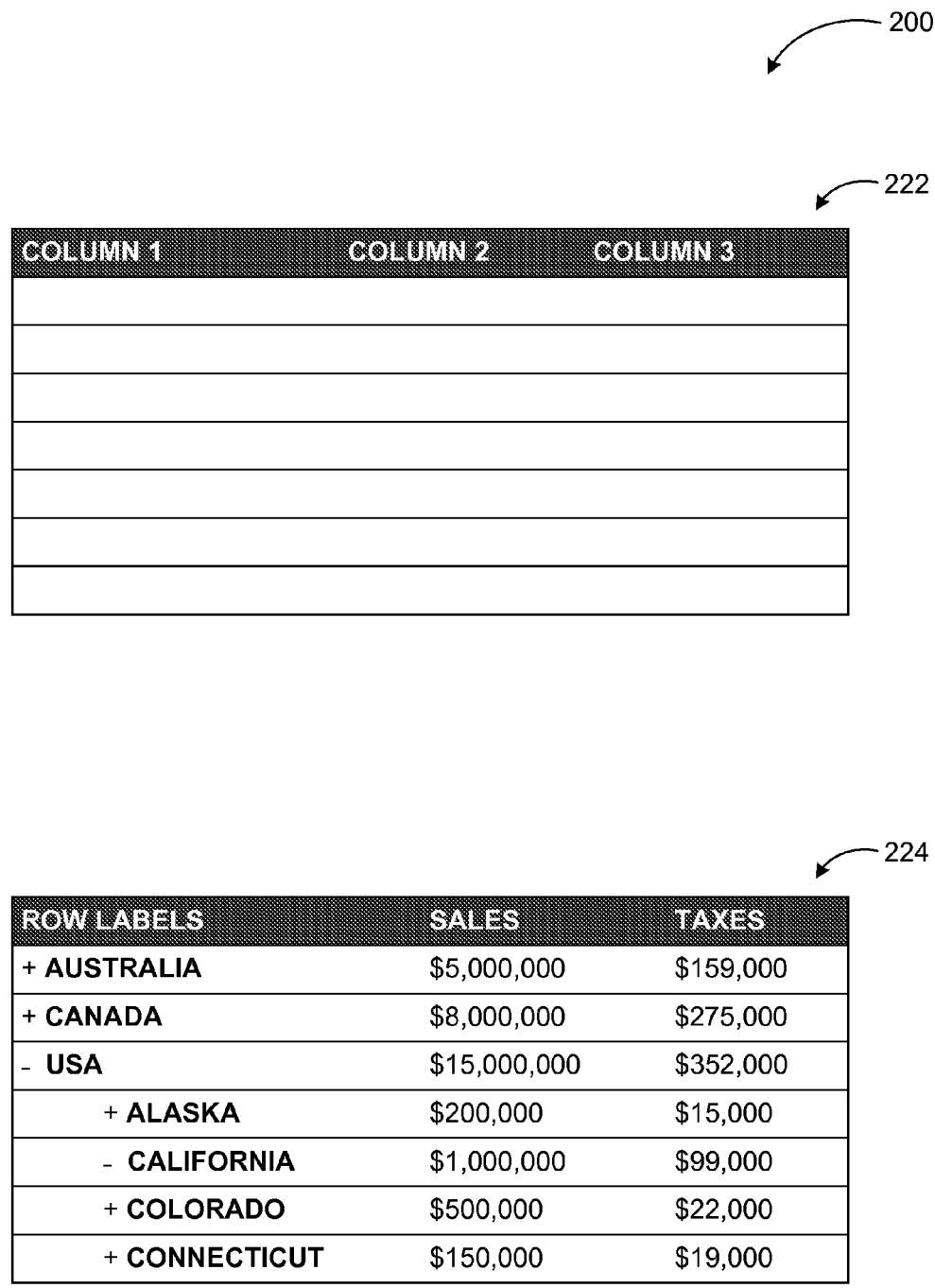
FIG. 2 illustrates two example report views, which may be presented by automatically creating default elements.

FIG. 2 illustrates two example report views, which may be presented by automatically creating default elements. A common usage of data is in generating various reports. For example, sales reports, performance reports, forecast reports, and comparable ones are used by many professions and are based on changing data from a number of sources. The data for such reports may be in a hierarchical structure. Such structures may be organizational, geographic, chronological, or otherwise.

Table 222 is an example of a table according to a conventional system, where the visualization application presenting the table may not be aware of how the user wants to see the data presented. Thus, at the beginning (i.e. when the user first activates the application), a blank table is presented to the user, and the user has to define columns, filters, and other visualization elements. Furthermore, when the data is retrieved, the user may be interested in a portion of the retrieved data. Once again, the user may have to sift through the available data and select the portion they would like to see.

Table 224 is an example visualization of data according to some embodiments. Upon connection by the user, the visualization application may determine default layout elements based on user/usage related information. To accomplish the automatic creation of default layout, query history of a data source may be stored along with user related information for the purpose of building a query relevance model. The visualization application may request from the query relevance model the dimensions, members, measures and other information stored in the data source that is relevant to the user who is connecting to the data source. Next, the dimensions, members, measures, etc. may be returned from the query relevance model and bound to the appropriate user interface elements for the visualization. If the data source is tabular (as opposed to multi-dimensional) the system may return the most relevant columns and filter states, or a visualization representing the table.

A system according to embodiments may store and query user related information such as user's profile, organizational position, title, usage history, and the like. Part of the information may be considered private or confidential depending on context. Thus, measures may be taken to protect the confidentiality of the information. For example, users may be given the opportunity to opt out from having their personal information stored or used. Additionally, user/usage related data may be protected employing measures like associating users with anonymous identifiers, password protection of the information, deletion of data after prescribed periods, and comparable ones.

Figure 3:
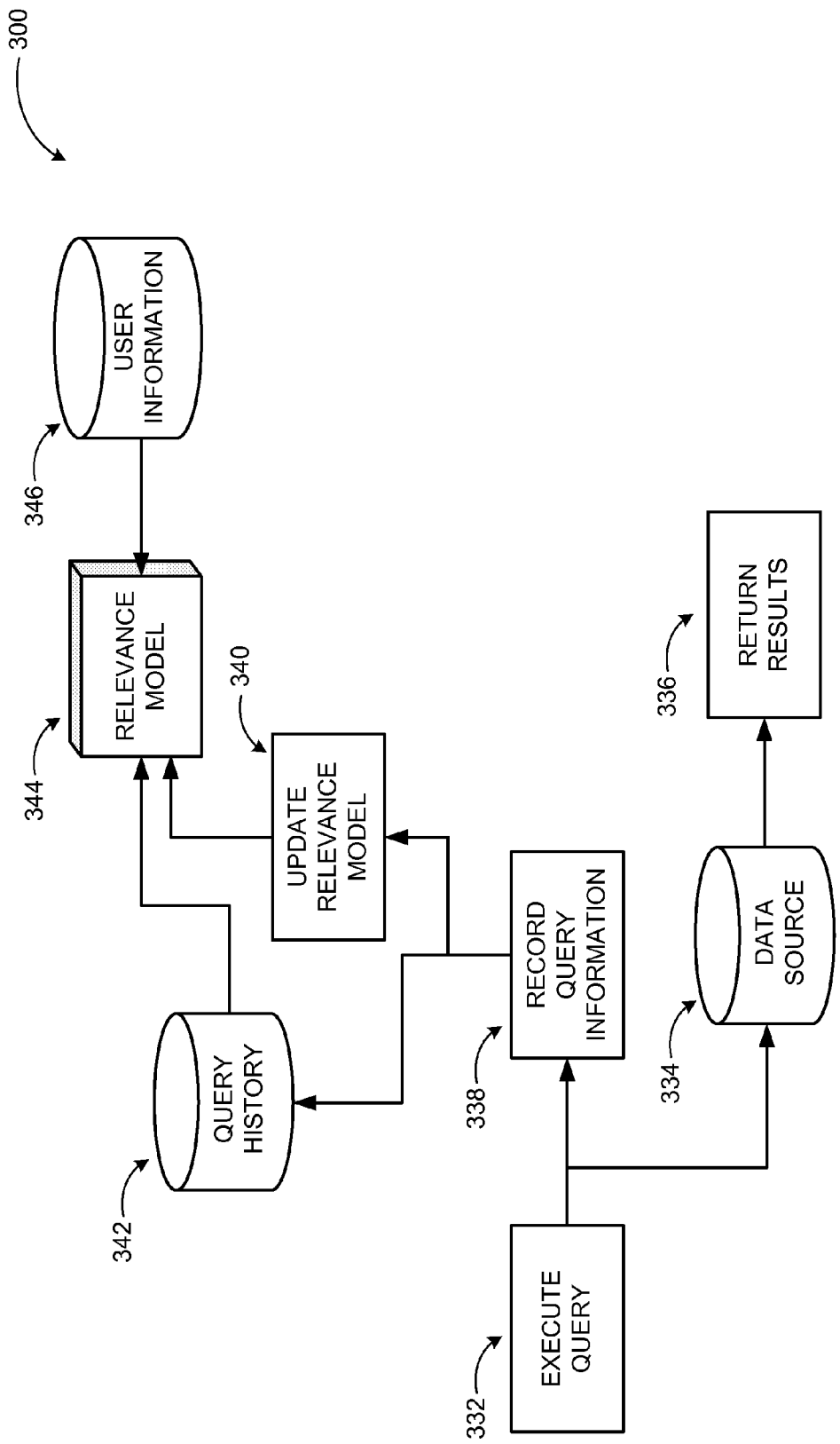
FIG. 3 illustrates major components and operations for storing query history in a system according to embodiments.

FIG. 3 illustrates major components and operations for storing query history in a system in diagram 300. When a query is executed (332) against a data source 334 (relational database, OLAP database, tabular list, etc.) the data source may record the query (338) in a query history data store 342. According to some embodiments, the query information may be stored in a data structure for each data source. The data structures may be relational databases, data cubes, flat files, structured documents (e.g. an extensible markup language 'XML' document), or any other schematized format. The query may be broken into component pieces each piece describing aspects of the query. For example, following query against a database may be broken down into the components listed in table 1 below.

TABLE 1

Components of example query

SELECT {[Products].[Product Name].[A]:[D],
    [Products].[Product Name].[Z]} ON COLUMNS,
        {[Time].Children} ON ROWS
    FROM [DB2AlphabloxCube]
    WHERE ([Sales] > 100)

| Component | Value |
| --- | --- |
| Rows | [Time].Children |
| Columns | [Products].[Product Name].[A]:[D] |
| Columns | [Products].[Product Name].[Z] |
| Filters | Sales |
| Measures | Default |

It should be noted that each component may contain more than one dimension hierarchy, member set, or measure. In the example query above, since measures are not explicitly included in the query, the default measure is automatically selected.

In addition to storing the components of each query, an identifier of the user 346 who is performing the query may also be stored. For example, the database may store an identifier in the form "DOMAIN\username" if the user is part of an enterprise domain. The recorded information may further include, but is not limited to, the defined data source(s), the measures in the requested query (e.g. price, amount, percentage, etc.), the dimensions in the requested query (e.g. by organization, by customer, by geography, by chronological division, etc.), aggregation method(s) requested in the query (e.g. average, min, max, sum, count, etc.), grouping requested in the query (e.g. "Group by Customer ID"), sorting requested in the query (e.g. "Sort descending by Date"), requesting user's identity, requesting user's affiliations, date and time of the query request, time it takes to execute the requested query, filter(s), formatting information, and the like.

The query history and user identifiers along with additional user activity information that may be gathered and stored in external systems may be combined into a query relevance model 344. A query relevance model 344 may be an algorithm or a module that executes a relevance algorithm. The relevance algorithm may include neural networks, Bayesian trees, collaborative filtering, and other techniques often found in search relevance, data mining, or recommendation systems such as various machine learning algorithms (e.g. weighted majority algorithm). The user or an administrator may be enabled to configure which algorithm is employed and the relative weights of the input variables in order to optimize the predictive accuracy of the model. Further parameterization may include definition of a threshold for the confidence level provided by the relevance. According to some embodiments, data mining techniques may be employed to build the model such that it can self-tune its algorithm(s) and employ variable weighting over time to produce more accurate relevance determination. The algorithm may accept as input a user identifier and return as output the most likely values for components of a data source. Each time a new query is executed (332), the relevance models 344 may be updated with the new query information (340).

Figure 4:
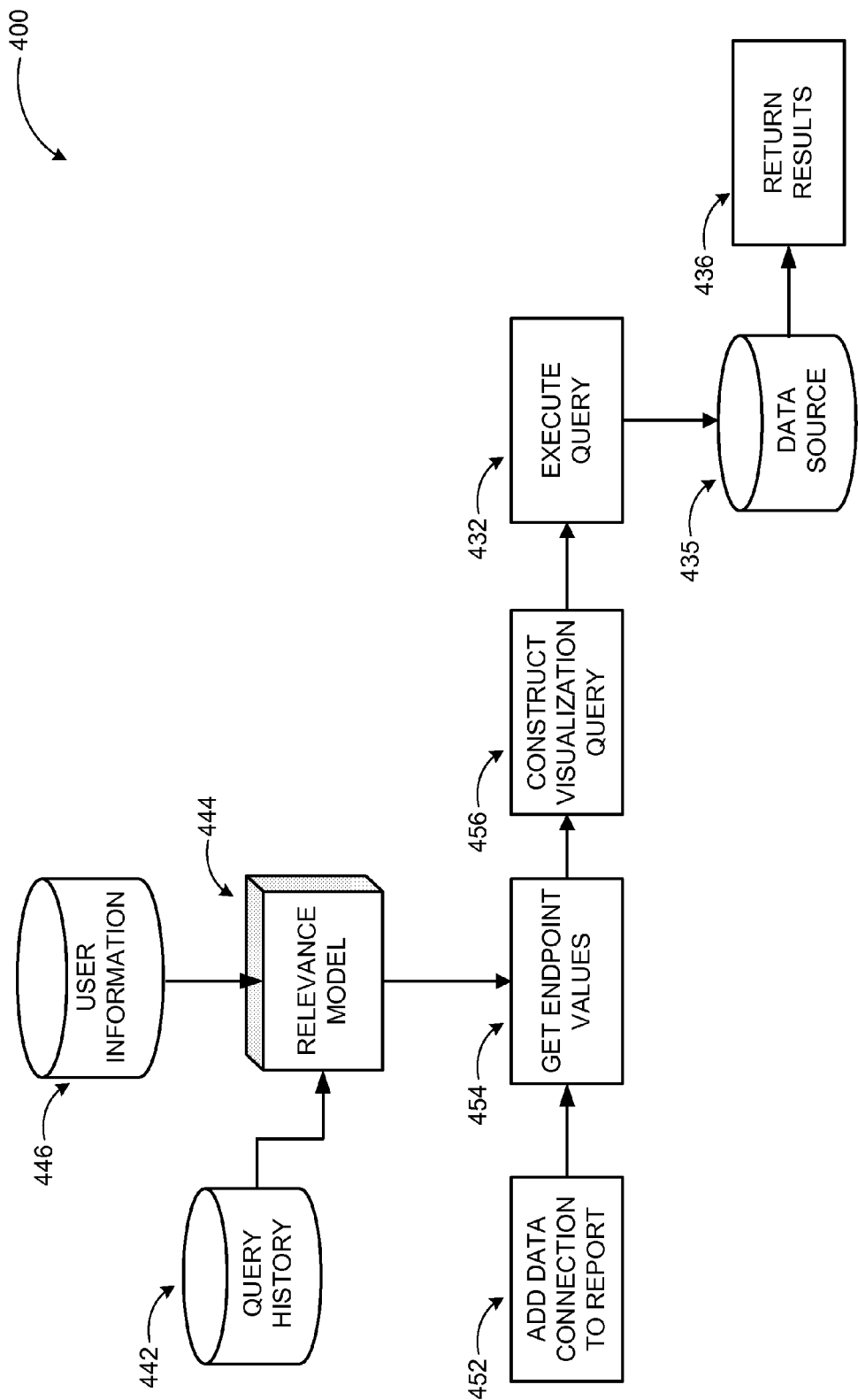
FIG. 4 illustrates major components and operations for using query history to set a relevant default query in a system according to embodiments.

FIG. 4 illustrates major components and operations for using query history to set a relevant default query in a system according to embodiments. Diagram 400 displays an example mechanism for requesting from the relevance model relevant default dimensions, hierarchies, member sets, and measures for a particular user in time. According to an example scenario, query relevance model 444 may receive query history information from a query history data store 442 and a user identifier "DOMAIN\username" from user information data store 446, and return a dimension hierarchy for rows, columns, filters, and measures that the model predicts are of high relevance to the user.

The model may take into consideration other factors like, but not limited to, overall popularity of dimensions, time decay, and the clustering of similar users. The model may be parameterized to adjust the relative importance of the inputs to the model. Based on one or more configurable parameters, specified by a user or specified as the result of the relevance model 444 self-optimizing, suggested default layout elements with a statistical likelihood over a predefined threshold may be chosen for visualization.

Once the relevance model returns the rows, columns, filters, measures, and additional components (e.g. slicers, KPIs, formatting elements, etc.), they need to be bound to controls in the user interface. This may be accomplished in multiple ways. According to some embodiments, the relevance model may return a fully-constructed query, which the calling visualization application can execute against the data source. According to other embodiments, the component values may be passed back to the calling visualization application individually, and the visualization application may construct the query executed against the data source. It should be noted that the visualization is not limited to a tabular representation. A system according to embodiments may represent the data as a chart, a diagram, a pivot table, or other graphical presentations.

In addition to providing a default query to the calling visualization application, the relevance model 444 may also provide a relevance ranking of the dimensions, measures, and other objects in the data source. The visualization application may use this ranking information to sort or filter components of the data source for the user's ease of use.

Bottom portion of diagram 400 illustrates example binding process, where upon adding of a data connection to the report (452) and return of endpoint values (454), a visualization query may be constructed (456). Then, the query may be executed (432) against the data source 435 and results returned to the visualization application (436) for visualization of the requested data.

According to further embodiments, the system may execute and present results of a preemptive query suggested by the relevance model (without waiting for the user to specify the query). The results may be stored in a data structure that is optimized for retrieval speed to enhance user experience when the data visualization application is activated. The data structure (or cache) may hold a configurable number of query results, and the results within the cache may expire based on a user preference, or information about the frequency with which the query data source is updated. The system may choose to update the default layout parameters and preemptive query results in the cache when an event is triggered (e.g. a new query is executed against the data source, changes in the data source) or on a schedule.

While the example systems in FIG. 3 and FIG. 4 have been described with specific elements and interactions, embodiments are not limited to these configurations and can be implemented with other components and configurations. Furthermore, embodiments are not limited to structured data or specific data sources. Any form of data and data sources may be used for employing smart defaults for data visualization using the principles described herein.

Figure 5:
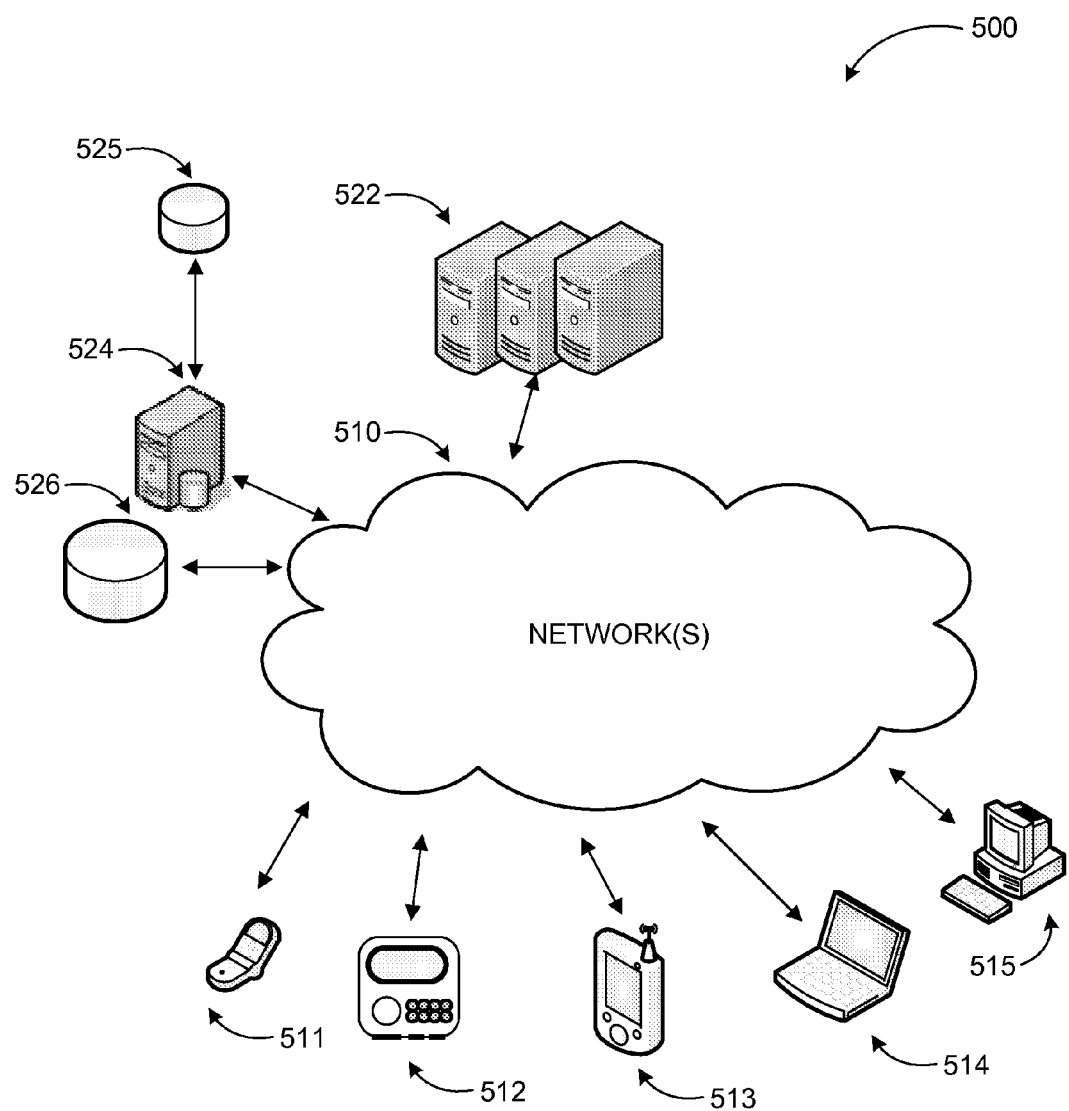
FIG. 5 is a networked environment, where a system according to embodiments may be implemented.

FIG. 5 includes diagram 500 of an example networked environment, where embodiments may be implemented. A platform providing default data visualization with above discussed features may be implemented via software executed over one or more servers 522 such as a hosted service. The platform may communicate with consuming applications on individual computing devices such as a cellular phone 511, smart automobile console 512, a handheld computer 513, a laptop computer 514, and desktop computer 515 ('client devices') through network(s) 510.

Client devices 511-515 are capable of communicating through a variety of modes between subscribers of a communication service. Users may execute any application on one of the client devices 511-515, which may require retrieval of data from one or more data sources. The platform providing data processing services with default data visualization may create default layout elements for visualizing data based on usage history, user information, and inferences. The platform may also execute a preemptive query based on a relevance model and provide results to a requesting user. Data may be retrieved from individual data sources such as data store 526 directly by the platform or data sources managed by a database server such as data store 525 managed by database server 524.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also comprise a plurality of distinct networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a data processing system providing default data visualization. Furthermore, the networked environments discussed in FIG. 5 are for illustration purposes only. Embodiments are not limited to the example applications, modules, or processes.

Figure 6:
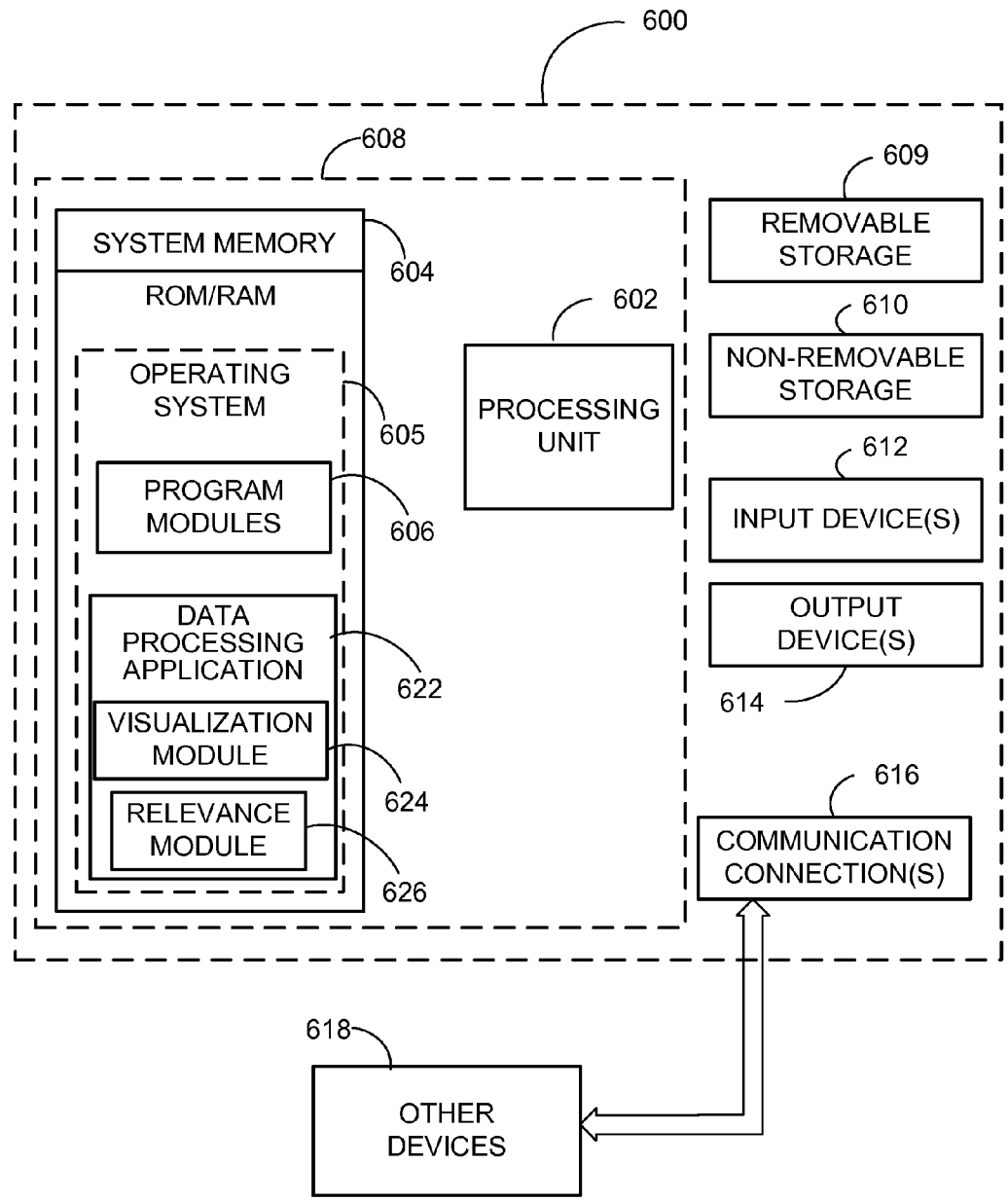
FIG. 6 is a block diagram of an example computing operating environment, where predictive data caching according to embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computer 600. In a basic configuration, computer 600 may be a server executing a data processing service with default data visualization or a client device performing the same, and include at least one processing unit 602 and system memory 604. Computer 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, data processing application 622, visualization module 624, and relevance module 626.

Visualization module 624 and relevance module 626 may be separate modules or an integrated part of data processing application 622 providing data retrieval, analysis, and/or visualization services. Data processing application 622 may provide a user identifier to the relevance module 626, which in return (using a relevance algorithm) may determine relevant layout elements for data visualization as discussed in more detail above enhancing user experience by reducing delays in presenting the visualization and selecting portions of data relevant to the user. This basic configuration is illustrated in FIG. 6 by those components within dashed line 608.

Computer 600 may have additional features or functionality. For example, the computer 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 600. Any such computer readable storage media may be part of computer 600. Computer 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computer 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, provide data for data processing application 622, and so on. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
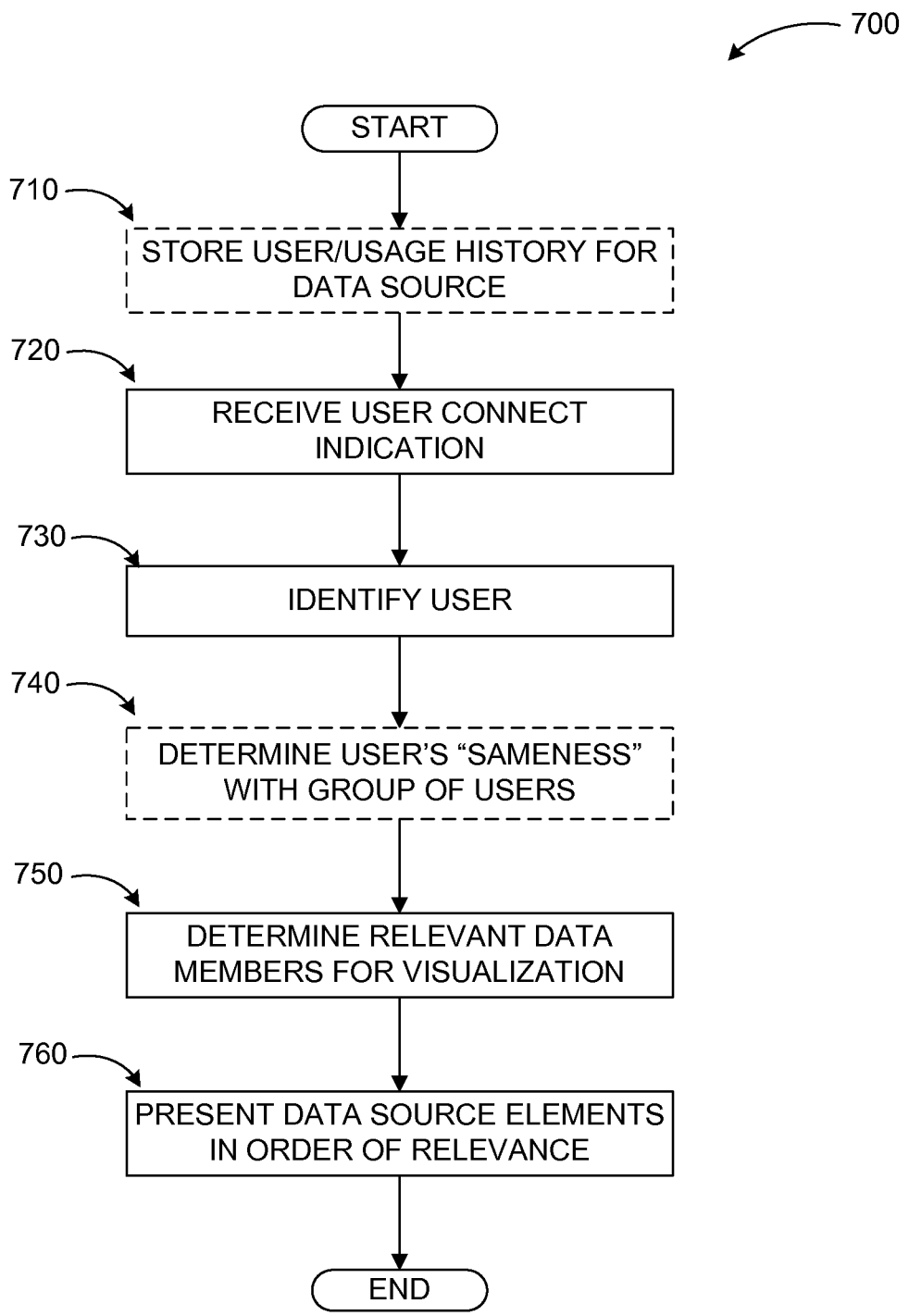
FIG. 7 illustrates a logic flow diagram for a process of using smart defaults for data visualization according to embodiments.

FIG. 7 illustrates a logic flow diagram for process 700 of using smart defaults for data visualization according to embodiments. Process 700 may be implemented by any data processing application executing queries and reporting results such as the ones described above.

Process 700 begins with optional operation 710, where user/usage history information is stored for each data source in the system. The information may be updated based on updates to user information, usage, and other factors such as frequency of usage. At operation 720, a user connect indication may be received (e.g. activation of a data visualization application). Upon receiving the user connect indication, the system may identify the user at operation 730 and optionally determine one or more other users similar to the identified user at operation 740.

The similar users group may be used to determine relevant layout elements for visualization at operation 750. For example, users within the same organizational group (e.g. accounting) may view a particular data report using the same layout elements (e.g. columns, filters, etc.). Thus, if a user is identified as belonging to the group, the default layout elements for the other users may be employed for the identified user as well. Relevant layout elements may also be determined based on usage history by the identified user, user's profiles, and comparable factors described herein. Upon determination of the relevant layout elements, data visualization may begin with the determined elements being displayed in order of relevance at operation 760. According to other embodiments, a "popular" view or a "users like you frequently look at" view may be surfaced visualizing a data set based on the relevance model feedback.

The operations included in process 700 are for illustration purposes. Employing smart defaults for data visualization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing default layout elements in data visualization, the method comprising:
receiving a user connection indication;
automatically retrieving user and usage information associated with the connecting user, the user information including an inferred relationship between the connecting user and at least one similar user by submitting an identifier as a token associated with the user within a context of the user's organization to a data source;
determining relevant layout elements based on the user and usage information, wherein the layout elements include at least one from a set of: a row definition, a column definition, a filter definition, a measure definition, and a formatting element definition;
binding the relevant layout elements to associated controls in a data visualization user interface by executing a visualization query against the data source and returning results of the visualization query to a visualization application for visualization of the relevant layout elements; and
presenting the data visualization user interface employing the bound relevant layout elements.

2. The method of claim 1, further comprising:
executing a query; and
presenting results of the query employing the relevant layout elements.

3. The method of claim 1, wherein the user information further includes at least one from a set of: a user profile, a user title, a user position within an organization, and an organizational profile.

4. The method of claim 1, wherein the usage information includes at least one from a set of: a query history, a peer usage, at least one defined data source, aggregation methods for past queries, and a date and time of past query requests.

5. The method of claim 1, further comprising:
providing privacy protection measures that include at least one from a set of: enabling the connecting user to opt out from having their personal information stored, associating the connecting user with an anonymous identifier, providing password protection for the user information, and deleting the user information after a predefined period.

6. The method of claim 1, further comprising inferring the layout elements from a past query, wherein the past query is broken into components and the components stored.

7. The method of claim 6, wherein the stored components of the past query include at least one from a set of: a row, a column, a filter, and a measure.

8. The method of claim 6, wherein the layout elements are inferred from a default component for components not explicitly included in the past query.

9. A computing device for executing a data visualization application, the computing device comprising:
a memory;
a processor coupled to the memory, the processor executing the data visualization application, wherein the data visualization application is configured to:
receive a user connection indication;
automatically retrieve user and usage information, including a frequency of usage, associated with the connecting user, the user information including an inferred relationship between the connecting user and at least one similar user, by submitting an identifier as a token associated with the user within a context of the user's organization to a data source;
provide the user and usage information to a relevance module, wherein the relevance module is configured to determine relevant layout elements, including dimensions, members, and measures relevant to the user, based on the user and usage information prior to a query request from the connecting user;

provide a relevance ranking of the dimensions, members and measures to enable sorting and filtering of information retrieved from the data source;

receive the relevant layout elements from the relevance module;

receive the query request from the connecting user;

execute the requested query; and visualize results of the requested query employing the received relevant layout elements by binding the relevant layout elements to associated controls in a data visualization user interface by executing a visualization query against the data source and returning results of the visualization query to the visualization application.

10. The computing device of claim 9, wherein the relevance module is further configured to execute a parameterized relevance algorithm for receiving the user and usage information as input and provide the relevant layout elements as output.

11. The computing device of claim 10, wherein the relevance algorithm returns a fully-constructed query to be executed by the data visualization application against a selected data source.

12. The computing device of claim 10, wherein the relevance algorithm returns component values for a query such that the query is constructed by the data visualization application to be executed against a selected data source.

13. The computing device of claim 10, wherein the relevance algorithm is one of a neural network algorithm, a Bayesian tree algorithm, a collaborative filtering algorithm, a data mining algorithm, and a machine learning algorithm.

14. The computing device of claim 10, wherein the data visualization application is further configured to enable the connecting user to modify at least one of the relevance algorithm and one or more relative weights associated with input parameters for the relevance algorithm in order to optimize an accuracy of the relevance module.

15. The computing device of claim 9, wherein the relevance module is further configured to retrieve data from an external data source to infer the relationship between the connecting user and at least one similar user.

16. The computing device of claim 9, wherein the query results are visualized as one of: a two-dimensional table, a pivot table, a multi-dimensional table, a chart, and a diagram.

17. A method for providing default layout elements in data visualization, the method comprising:

receiving a user connection indication;

automatically retrieving user and usage information associated with the connecting user, the user information including an inferred relationship between the connecting user and at least one similar user;

storing a query history and one or more user identifiers along with additional user activity information in an external system to be combined into a relevance model;

providing the user and usage information as input to the relevance model configured to determine relevant layout elements, the relevance module executing a parameterized relevance algorithm for returning one of: a fully-constructed query to be executed by a data visualization application against a selected data source and component values for a query such that the query is constructed by the data visualization application to be executed against a selected data source;

receiving the relevant layout elements, including dimensions, members, and measures relevant to the user, from the relevance model prior to a query request from the connecting user;

providing a relevance ranking of the dimensions, members, and measures to enable sorting and filtering of information retrieved from the data source;

receiving the query request from the connecting user;

executing the requested query; and visualizing results of the requested query employing the relevant layout elements by binding the relevant layout elements to associated controls in a data visualization user interface by executing a visualization query against the data source and returning results of the visualization query to a visualization application.

18. The method of claim 17, wherein the relevance model is configured to take into consideration a popularity of layout elements among similar users, a time decay, and a clustering of similar users, and wherein the relevance model is parameterized to adjust a relative importance of the inputs to the relevance model.

19. The method of claim 17, wherein the method further includes:

surfacing one of a "popular" view and a "users like you frequently look at" view data set based on the relevance model feedback.

* * * * *